UNITED STATES PATENT OFFICE.

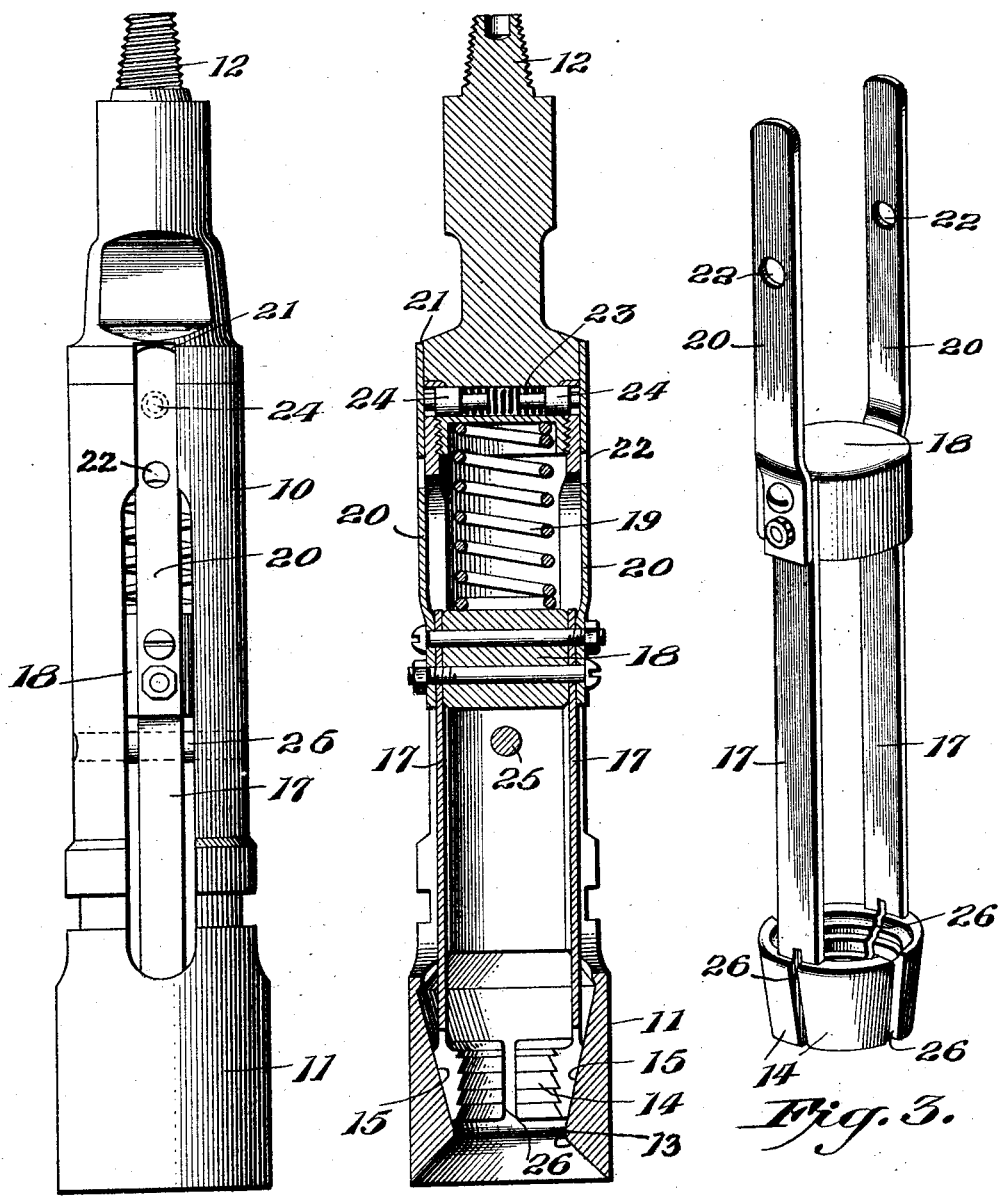

VIRGIL WARREN MOYER, OF PAWHUSKA, OKLAHOMA, ASSIGNOR TO THE MIDLAND SUPPLY COMPANY, OF PAWHUSKA, OKLAHOMA, A CORPORATION OF OKLAHOMA.

FISHING TOOL.

1,407,878.  Specification of Letters Patent.  Patented Feb. 28, 1922.

Application filed August 28, 1920. Serial No. 406,540.

*To all whom it may concern:*

Be it known that I, VIRGIL WARREN MOYER, a citizen of the United States, residing at Pawhuska, in the county of Osage and State of Oklahoma, have invented certain new and useful Improvements in Fishing Tools; and I do hereby declare the following to be a full, clear, and exact description of the same, reference being had to the accompanying drawings, forming part of this specification.

This invention relates to tools commonly known as fishing tools utilized for recovering oil and gas well drilling implements lost in the well and one object is to provide a form of gripping jaw for the socket that will evenly distribute all strains over the adjacent portion of the socket, thereby preventing distortion of the latter and adding to its life and efficiency.

A further object of the invention is to provide the socket with means to permit the gripping jaws to release the lost tool while in the well should it be impossible to remove said tool with the socket.

In the accompanying drawings,—

Figure 1 is an elevation of a fishing tool embodying the present invention.

Figure 2 is a vertical longitudinal section of the tool taken at right angles to Fig. 1.

Figure 3 is a view of the gripping jaws and associated parts removed from the socket.

As shown in the drawings the socket consists generally of a hollow cylindrical body portion 10, a throat portion 11 at its lower end and a screw-threaded projection 12 at its upper end for attachment to means for lowering the socket down into the well. The interior wall of the throat portion 11 is flared as at 13 to guide the end of the tool lost in the well into the interior of the socket.

Immediately above the flared portion 13 of the socket the interior wall of the latter is tapered downwardly as indicated at 15 to form a restricted passage 16 at the top of the flared portion 13 and positioned within the tapered portion 15 is a pair of substantially semi-circular jaws or slips 14 between which the end of the lost tool is adapted to be gripped when the slips are moved towards each other by the converging wall 15 of the socket. The jaws are movable longitudinally of the socket so that they may expand to accommodate tools of various sizes but when moved upwardly a sufficient distance they will be locked in a position where they cannot grip the lost tool, as will be later described, for the purpose of permitting withdrawal of the fishing tool from the well without the lost tool. Each slip or jaw 14 is provided with an upwardly extending rod or arm 17, two rods being attached at their upper ends to a block 18 in the socket, said block being circular in cross section to make a close fit with the interior of the socket so that the jaws will move uniform distances up and down in the socket. A spring 19 is interposed between the block 18 and the top of the socket to yieldingly depress said block to a position where the slips or jaws 14 will be pushed down against the wall of the tapered portion 15 and in proximity to the restricted passage 16, in which position the jaws are sufficiently close together to grip a tool between them.

The bottom faces of the slips 14 form a continuation of the wall of the throat 11 and, as is well understood, a lost tool, when it enters the throat, pushes the jaws or slips upwardly against the tension of spring 19 until said slips reach a point on the tapered wall 15 where they can spread apart a sufficient distance to admit the end of the tool. After the tool has entered between the slips any tendency it may have to withdraw is overcome by the slips being forced downwardly and towards each other by the spring 19 and tapered wall 15, respectively, to grip the tool.

Secured to block 18 and forming an upward continuation of arms 17 is a pair of arms 20 whose upper ends are positioned in longitudinally extending grooves or guides 21 on the exterior of the socket. Adjacent their upper ends said arms 20 are provided with apertures 22 that are normally positioned below transverse aperture 23 in the upper end of the socket and in which is positioned a pair of spring-pressed pins 24. A cross pin 25 secured in the socket substantially intermediate the ends of the latter limits the downward movement of the block 18 and jaws 14 and also normally determines the distance a lost tool may enter the socket, but as the removal of the lost tool from the well is sometimes impossible pin 25 is adapted to be broken by driving the socket down so that the end of the lost tool will deliver a heavy blow and break the pin.

Pin 25 having been broken the end of the lost tool is then free to elevate the block 18 and gripping jaws until the spring-pressed pins 24 are projected into the apertures 22 in arms 20. The block and jaws will then be locked in their elevated position, the jaws occupying a position at the top of the tapered portion 15 of the socket where they will be unable to securely grip the tool and the socket may be withdrawn from the well without said tool.

To impart resiliency to the slips or jaws 14 and to evenly distribute strains over the lower portion of the socket, each slip or jaw is made substantially semi-circular and is formed with a vertical slot 26 extending from its bottom to its top and a short distance up into the arms 17. A jaw of such construction is found to be highly resilient and in operation the grab puts a uniform strain on the socket, thereby preventing a bulging and prolonging the life of the socket and adding to its efficiency.

What is claimed is:

1. In a fishing tool, the combination of a socket, a pair of longitudinally movable slips positioned within the lower end of the socket, a block slidably mounted in the socket above the slips, upwardly extending arms secured to the slips and to the block, a second pair of arms carried by the block and extending upwardly from the block and forming a continuation of the arms secured to the slips, means interposed between the upper end of the socket and the block for yieldingly retaining the slips in the lower end of the socket, means interposed between the slips and said block for normally limiting the downward movement of the slips, and spring pressed pins slidably mounted in the head adapted to engage the arms carried by the block and lock the block and slips against longitudinal movement upon an abnormal upward movement of the slips.

2. A grab for fishing tools embodying a pair of slips, a member for positioning the slips in the socket each of said slips having a body portion and an upwardly extending arm connected to the positioning member, there being an upwardly extending slot in the body portion and the lower end of the arm of each of said slips.

3. A slip for fishing tool grabs comprising a body portion and an upwardly extending arm, there being an upwardly extending continuous slot in said body portion and the adjacent end of said arm.

4. A grab for fishing tools embodying a pair of substantially semi-circular slips, and an upwardly extending arm secured to each of said slips, there being an upwardly extending slot in each of said slips and in the lower end of each of said arms.

VIRGIL WARREN MOYER.